US012621011B2

(12) United States Patent
Wang et al.

(10) Patent No.: US 12,621,011 B2
(45) Date of Patent: May 5, 2026

(54) GAIN CONTROL METHOD AND SIGNAL AMPLIFIER

(71) Applicant: VIVO MOBILE COMMUNICATION CO., LTD., Dongguan (CN)

(72) Inventors: Huan Wang, Dongguan (CN); Jinhua Liu, Dongguan (CN); Shuyan Peng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 282 days.

(21) Appl. No.: 18/388,616

(22) Filed: Nov. 10, 2023

(65) Prior Publication Data

US 2024/0080051 A1 Mar. 7, 2024

Related U.S. Application Data

(63) Continuation of application No. PCT/CN2022/091938, filed on May 10, 2022.

(30) Foreign Application Priority Data

May 11, 2021 (CN) .......................... 202110512345.5

(51) Int. Cl.
*H04B 1/04* (2006.01)

(52) U.S. Cl.
CPC ......... *H04B 1/0458* (2013.01); *H04B 1/0475* (2013.01); *H04B 2001/0416* (2013.01)

(58) Field of Classification Search
CPC ........ H04B 2001/0416; H04B 7/15535; H04B 7/15507; H04W 52/0241; H04W 52/46
See application file for complete search history.

(56) References Cited

U.S. PATENT DOCUMENTS

| | | | |
|---|---|---|---|
| 6,690,915 B1 | 2/2004 | Ito et al. | |
| 7,680,452 B2 | 3/2010 | Oodachi et al. | |
| 7,869,761 B2 | 1/2011 | Park et al. | |
| 10,784,952 B2 * | 9/2020 | Huang | H04B 7/15557 |
| 2002/0044594 A1 * | 4/2002 | Bongfeldt | H04W 52/10 |
| | | | 375/213 |
| 2002/0065094 A1 * | 5/2002 | Schmutz | H04B 7/2606 |
| | | | 455/70 |

(Continued)

FOREIGN PATENT DOCUMENTS

| | | |
|---|---|---|
| CN | 1292607 A | 4/2001 |
| CN | 101036319 A | 9/2007 |

(Continued)

*Primary Examiner* — Un C Cho
(74) *Attorney, Agent, or Firm* — The Webb Law Firm

(57) ABSTRACT

A gain control method for a signal amplifier includes obtaining, by the signal amplifier, target information; determining, by the signal amplifier, a power adjustment parameter of the signal amplifier according to the target information, where the power adjustment parameter includes any one of the following: an amplification multiple-related parameter and a transmit power-related parameter; and adjusting, by the signal amplifier, a power parameter of the signal amplifier according to the power adjustment parameter, where the power parameter includes any one of the following: an amplification multiple and transmit power.

20 Claims, 4 Drawing Sheets

A signal amplifier obtains target information ⟩301

The signal amplifier determines a power adjustment parameter of the signal amplifier according to the target information ⟩302

The signal amplifier adjusts a power parameter of the signal amplifier according to the power adjustment parameter ⟩303

(56)                    References Cited

U.S. PATENT DOCUMENTS

| | | | | |
|---|---|---|---|---|
| 2006/0205342 A1* | 9/2006 | McKay | .................... | H04B 3/36 |
| | | | | 455/11.1 |
| 2008/0014862 A1 | 1/2008 | Van Buren et al. | | |
| 2008/0076349 A1* | 3/2008 | Hwang | .............. | H04B 7/15535 |
| | | | | 455/7 |
| 2008/0076437 A1 | 3/2008 | Wilson et al. | | |
| 2009/0196215 A1* | 8/2009 | Sabat | ................. | H04B 7/15535 |
| | | | | 370/315 |
| 2011/0149769 A1* | 6/2011 | Nagaraja | .............. | H04W 52/12 |
| | | | | 370/252 |
| 2011/0217943 A1 | 9/2011 | Ashworth et al. | | |
| 2011/0235568 A1 | 9/2011 | Esteves et al. | | |
| 2012/0294224 A1 | 11/2012 | Silva et al. | | |
| 2014/0056267 A1 | 2/2014 | Li et al. | | |
| 2016/0294441 A1 | 10/2016 | Fazlollahi et al. | | |
| 2017/0135117 A1 | 5/2017 | Raggio et al. | | |
| 2017/0288766 A1* | 10/2017 | Cook | ................. | H04B 7/15535 |
| 2018/0294868 A1* | 10/2018 | Ashworth | .......... | H04B 7/15507 |
| 2021/0258889 A1 | 8/2021 | Zhang et al. | | |

FOREIGN PATENT DOCUMENTS

| | | | | | |
|---|---|---|---|---|---|
| CN | 102812740 A | 12/2012 | | | |
| CN | 103945504 A | 7/2014 | | | |
| CN | 105992330 A | 10/2016 | | | |
| CN | 106559818 A | 4/2017 | | | |
| CN | 108292948 A | 7/2018 | | | |
| CN | 110536395 A | 12/2019 | | | |
| EP | 2234289 A2 * | 9/2010 | ......... | H04B 7/15535 |
| WO | 2012149683 A1 | 11/2012 | | | |
| WO | 2021056463 A1 | 4/2021 | | | |

* cited by examiner

An upstream network side device generates target information — 401

The upstream network side device sends the target information to the signal amplifier — 402

GAIN CONTROL METHOD AND SIGNAL AMPLIFIER

CROSS-REFERENCE TO RELATED APPLICATIONS

This application is a Bypass Continuation Application of International Patent Application No. PCT/CN2022/091938, filed May 10, 2022, and claims priority to Chinese Patent Application No. 202110512345.5, filed May 11, 2021, the disclosures of which are hereby incorporated by reference in their entireties.

BACKGROUND OF THE INVENTION

Field of the Invention

This application pertains to the field of communication technologies, and specifically relates to a gain control method and apparatus for a signal amplifier, and a network side device.

Description of Related Art

A signal amplifier is configured to extend a coverage range of a cell. Functions of the signal amplifier mainly include: receiving and amplifying a downlink signal from a base station, so that strength of the signal reaching a UE increases, and amplifying an uplink signal from the UE, so that strength of the uplink signal from the UE to the base station increases. The signal amplifier may receive control from the base station, that is, the base station may control transmit parameters of the amplifier, such as on/off and a transmit beam of the signal amplifier, to improve signal power of the amplifier and reduce interference. As shown in FIG. 1, a network structure includes three network nodes, and an intermediate network node is a signal amplifier, including a mobile termination (MT) and a repeater unit RU (RU). The MT is configured to establish a connection to the base station, and the base station interacts with the signal amplifier by using the MT, so as to indicate a transmission parameter of the MT or the RU of the signal amplifier.

However, after a signal amplifier is introduced to a network side device, a coverage range of a cell is affected by a state of a channel from the base station to the signal amplifier. For example, when a link from the base station to the signal amplifier is blocked, the coverage range of the cell is reduced.

SUMMARY OF THE INVENTION

According to a first aspect, a gain control method for a signal amplifier is provided, where the method is applied to a signal amplifier, and the method includes: obtaining, by the signal amplifier, target information; determining, by the signal amplifier, a power adjustment parameter of the signal amplifier according to the target information, where the power adjustment parameter includes any one of the following: an amplification multiple-related parameter and a transmit power-related parameter; and adjusting, by the signal amplifier, a power parameter of the signal amplifier according to the power adjustment parameter, where the power parameter includes any one of the following: an amplification multiple and transmit power.

According to a second aspect, a gain control apparatus for a signal amplifier is provided, where the apparatus includes an obtaining module, a determining module, and an adjustment module, where the obtaining module is configured to obtain target information; the determining module is configured to determine a power adjustment parameter of the signal amplifier according to the target information, where the power adjustment parameter includes any one of the following: an amplification multiple-related parameter and a transmit power-related parameter, where the adjustment module is configured to adjust a power parameter of the signal amplifier according to the power adjustment parameter, and the power parameter includes any one of the following: an amplification multiple and transmit power.

According to a third aspect, a gain control method for a signal amplifier is provided, applied to an upstream network side device, and the method includes: generating, by the upstream network side device, target information; and sending, by the upstream network side device, the target information to the signal amplifier; where the target information is used to indicate a power adjustment parameter of the signal amplifier, and the power adjustment parameter includes any one of the following: an amplification multiple-related parameter and a transmit power-related parameter.

According to a fourth aspect, a gain control apparatus for a signal amplifier is provided, where the apparatus includes a generation module and a sending module, where the generation module is configured to generate target information; and the sending module is configured to send, to the signal amplifier, the target information generated by the generation module; where the target information is used to indicate a power adjustment parameter of the signal amplifier, and the power adjustment parameter includes any one of the following: an amplification multiple-related parameter and a transmit power-related parameter.

According to a fifth aspect, a network side device is provided, where the network side device includes a processor, a memory, and a program or instruction stored in the memory and executable on the processor, and the program or instruction is executed by the processor to implement the method in the first aspect or to implement the method in the third aspect.

According to a sixth aspect, a network side device is provided, including a processor and a communication interface, where the processor is configured to obtain target information; the processor is further configured to determine a power adjustment parameter of a signal amplifier according to the target information, where the power adjustment parameter includes any one of the following: an amplification multiple-related parameter and a transmit power-related parameter; and the processor is further configured to adjust a power parameter of the signal amplifier according to the power adjustment parameter, where the power parameter includes any one of the following: an amplification multiple and transmit power.

According to a seventh aspect, a network side device is provided, including a processor and a communication interface, where the processor is configured to generate target information, and the communication interface is configured to send the target information to a signal amplifier; and where the target information is used to indicate a power adjustment parameter of the signal amplifier, and the power adjustment parameter includes any one of the following: an amplification multiple-related parameter and a transmit power-related parameter.

According to an eighth aspect, a non-transitory readable storage medium is provided, where a program or instructions are stored on the non-transitory readable storage medium, and the program or the instructions are executed by a processor to implement the steps of the method according to the first aspect or the steps of the method according to the third aspect.

According to a ninth aspect, a chip is provided, where the chip includes a processor and a communication interface, the communication interface is coupled to the processor, and the processor is configured to run a program or instructions to implement the method according to the first aspect or implement the method according to the third aspect.

According to a tenth aspect, a computer program/program product is provided, where the computer program/program product is stored in a non-volatile storage medium, and the program/program product is executed by at least one processor to implement the steps of the gain control method for a signal amplifier according to the first aspect or the third aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first" and "second" are used to distinguish between similar objects, but are unnecessarily used to describe a specific sequence or order. It should be understood that the terms in such a way are exchangeable in a proper case, so that the embodiments of this application described herein can be implemented in an order other than the order shown or described herein. In addition, objects distinguished by "first", "second", and the like are generally of one type, and a quantity of objects is not limited. For example, there may be one or more first objects. In addition, "and/or" in this specification and the claims represents at least one of the connected objects, and the character "I" generally represents an "or" relationship between the associated objects.

It should be noted that technologies described in embodiments of this application are not limited to a Long Term Evolution (LTE)/LTE-Advanced (LTE-A) system, and may be further applied to another wireless communication system such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-LTE-A), and another system. The terms "system" and "network" in the embodiments of this application are often used interchangeably. The described technology may be used in the foregoing system and radio technology, or may be used in another system and radio technology. The following description describes a New Radio (NR) system for example, and the NR term is used in most of the following descriptions. However, these technologies may also be applied to applications other than NR system applications, such as a 6th Generation (6G) communication system.

Figure 1:
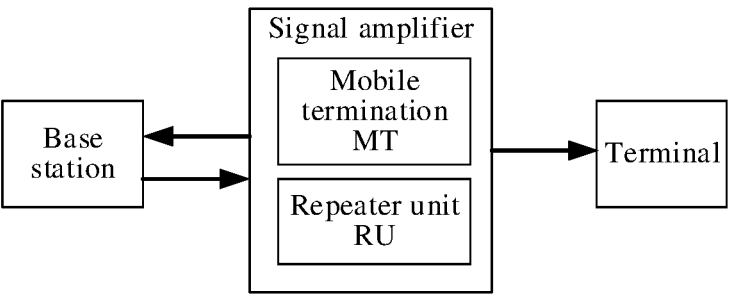
FIG. 1 is a block diagram of a communication system according to an embodiment of this application.

FIG. 1 is a block diagram of a wireless communication system applicable to an embodiment of this application. The wireless communication system includes a terminal, a signal amplifier, and a network side device. The terminal may also be referred to as a terminal device or a user equipment (UE). The terminal may be a terminal device such as a mobile phone, a tablet computer, a laptop computer, a personal digital assistant (PDA), a palmtop computer, a netbook, an ultra-mobile personal computer (UMPC), a mobile Internet device (MID), a wearable device, or a vehicle user equipment (VUE), or a pedestrian user equipment (PUE). The wearable device includes: a smart watch, a wristband, a headset, and glasses. It should be noted that, this embodiment of this application does not limit a particular type of the terminal. The network side device may be a base station or a core network. The base station may be referred to as a Node B, an evolved Node B, an access point, a base transceiver station (BTS), a radio base station, a radio transceiver, a basic service set (BSS), an extended service set (ESS), a Node B, an evolved Node B (eNB), a home Node B, a home evolved Node B, a WLAN access point, a Wi-Fi node, a transmitting receiving point (TRP), or another suitable term in the field. Provided that a same technical effect is achieved, the base station is not limited to a specific technical term. It should be noted that in this embodiment of this application, only a base station in an NR system is used as an example, but a specific type of the base station is not limited.

With reference to the accompanying drawings, the following describes in detail, by using some embodiments and application scenarios, the gain control method for a signal amplifier provided in the embodiments of this application.

Figure 2:
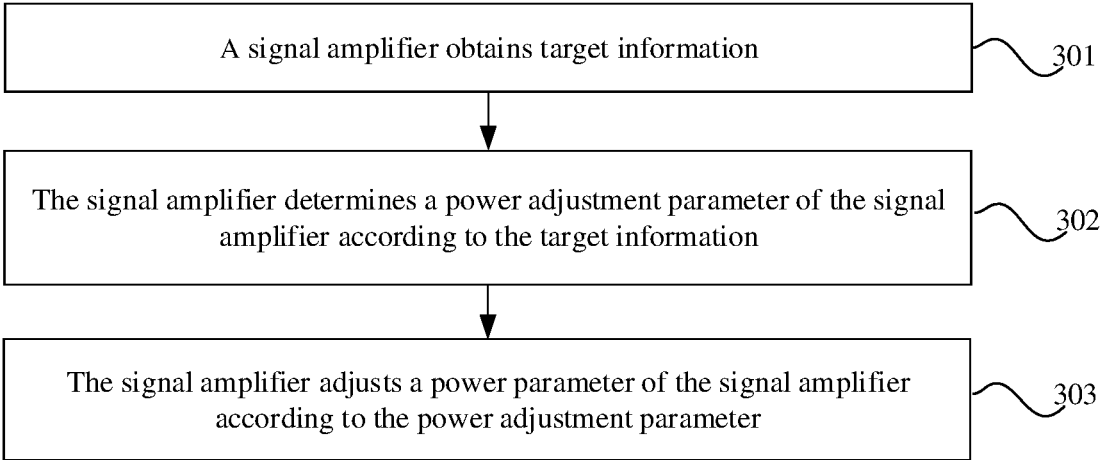
FIG. 2 is a first flowchart of a gain control method for a signal amplifier according to an embodiment of this application.

This embodiment provides a gain control method for a signal amplifier. As shown in FIG. 2, the gain control method for a signal amplifier includes the following steps 301 to 303.

Step 301: The signal amplifier obtains target information.

In this embodiment of this application, the signal amplifier may receive the target information sent by an upstream network side device, or may obtain the target information by itself.

In this embodiment of this application, the upstream network side device may be an upstream node.

Optionally, in this embodiment of this application, the target information includes at least one of the following: a first indication sent by an upstream node of the signal amplifier; a path loss parameter from the upstream node to the signal amplifier; or transmit power of a mobile termination MT of the signal amplifier.

For example, the first indication is used to indicate the power adjustment parameter.

For example, the first indication may be an indication by the upstream node.

For example, the power adjustment parameter includes any one of the following: an amplification multiple-related parameter and a transmit power-related parameter.

In an example, the amplification multiple-related parameter may be a parameter used to adjust an amplification multiple of transmit power of the signal amplifier.

Further, the amplification multiple-related parameter may be a parameter used to adjust an amplification multiple of transmit power of a repeater module (RU) in the signal amplifier.

In an example, the transmit power-related parameter may be a parameter used to adjust the transmit power of the signal amplifier.

Further, the amplification multiple-related parameter may be a parameter used to adjust the transmit power of the repeater module (RU) in the signal amplifier.

For example, the path loss parameter may be a parameter corresponding to a path loss from the upstream network side device to the signal amplifier.

For example, the upstream node may include any one of the following: an upstream base station, an upstream control node, and a central node.

It may be understood that, in this embodiment of this application, the signal amplifier may determine the power adjustment parameter of the signal amplifier according to an indication by the upstream network side device (for example, the upstream node), or may independently adjust the amplification multiple. When the target information is a first indication, the signal amplifier may determine the power adjustment parameter of the signal amplifier according to the indication by the upstream network side device (for example, the upstream node), and when the target information is a path loss parameter from the upstream node to the signal amplifier, the signal amplifier may independently adjust the amplification multiple.

Further, the signal amplifier may include a plurality of power adjustment parameters, where some of the power adjustment parameters are determined according to the upstream network side device (for example, the indication by the upstream node), and the other part of the power adjustment parameters are independently determined by the signal amplifier. This is not limited in this embodiment of this application.

Step 302: The signal amplifier determines a power adjustment parameter of the signal amplifier according to the target information.

Step 303: The signal amplifier adjusts a power parameter of the signal amplifier according to the power adjustment parameter.

In this embodiment of this application, the power parameter includes any one of the following: an amplification multiple and transmit power. The power parameter may be further divided into an uplink power parameter and a downlink power parameter. The uplink power parameter and the downlink power parameter may be separately determined or adjusted, or it is assumed that the uplink power parameter and the downlink power parameter are the same, or it is assumed that a difference or a ratio between the uplink power parameter and the downlink power parameter is a preset value.

In the gain control method for a signal amplifier provided in this embodiment of this application, after obtaining the target information, the signal amplifier determines the amplification multiple-related parameter or the transmit power-related parameter of the signal amplifier according to the target information, and finally adjusts the amplification multiple or the transmit power of the signal amplifier according to the amplification multiple-related parameter or the transmit power-related parameter. In this way, when a channel state changes, the signal amplifier may correspondingly flexibly adjust the amplification multiple and the transmit power of the signal amplifier in a manner of obtaining the target information in a timely manner, so as to avoid a problem of a change of a coverage range of a cell due to a change of the channel state.

Optionally, in this embodiment of this application, an indication type of the first indication includes at least one of the following: a dynamic indication or a semi-static indication.

Optionally, in this embodiment of this application, the power adjustment parameter includes at least one of the following:

an amplification multiple of the signal amplifier;

an amplification multiple adjustment value of the signal amplifier;

an amplification multiple control parameter of the signal amplifier;

an amplification multiple control parameter adjustment value of the signal amplifier;

transmit power of the signal amplifier;

a transmit power adjustment value of the signal amplifier;

a transmit power control parameter of the signal amplifier; or a transmit power control parameter adjustment value of the signal amplifier.

For example, when the power adjustment parameter is the amplification multiple, the amplification multiple may directly indicate the amplification multiple of the transmit power of the signal amplifier. For example, the amplification multiple of the transmit power of the RU in the signal amplifier is directly indicated.

Optionally, in this embodiment of this application, at least one of the following is used to indirectly control the amplification multiple of the signal amplifier:

the transmit power of the signal amplifier;

the transmit power control parameter adjustment value of the signal amplifier;

the transmit power control parameter of the signal amplifier; or the transmit power control parameter adjustment value of the signal amplifier.

It should be noted that, When a difference between the transmit power of the signal amplifier and the transmit power of the MT is a preset value (for example, 0), or the difference is within a preset range, the signal amplifier determines the power adjustment parameter according to the transmit power. The preset range may be preconfigured in the signal amplifier.

For example, the transmit power control parameter adjustment value and the amplification multiple adjustment value may be in a proportional relationship.

In an example, the transmit power control parameter adjustment value is equal to the amplification multiple adjustment value.

For example, the transmit power and the amplification multiple may be in a proportional relationship.

For example, a first difference between current actual transmit power and to-be-amplified transmit power of the signal amplifier is proportional to a second difference between a current actual amplification multiple and a to-be-reached amplification multiple of the signal amplifier.

In an example, the first difference and the second difference may be equal.

For example, a first ratio between the current actual transmit power and the to-be-amplified transmit power of the signal amplifier is proportional to a second ratio between the current actual amplification multiple and the to-be-reached amplification multiple of the signal amplifier.

In an example, the first ratio and the second ratio may be equal.

Optionally, in this embodiment of this application, the amplification multiple adjustment value of the signal amplifier includes any one of the following:

an adjustment value relative to an amplification multiple configured semi-statically;

an adjustment value relative to an amplification multiple before the first indication is received; and an adjustment value relative to an amplification multiple before the first indication received takes effect.

It may be understood that the first indication may be indication information executed immediately after the signal amplifier receives the first indication, or may be indication information executed after a period of time after the signal amplifier receives the first indication. Therefore, the amplification multiple adjustment value of the signal amplifier may be an adjustment value relative to an amplification multiple before the first indication received takes effect.

For example, assuming that beta is the amplification multiple, where beta(N) is an adjusted amplification multiple, beta(N−1) is an unadjusted amplification multiple, delta is an adjustment value of the amplification multiple obtained according to the first indication, beta 1 is a maximum value of the amplification multiple, beta 2 is a minimum value of the amplification multiple, and beta 1 and beta 2 are preset, beta(N)=beta(N−1)+delta. For example, the amplification multiple obtained according to the first indication is not greater than beta 1 and/or is not less than beta 2. In this case, if it is greater than beta 1, the amplification multiple is beta 1, and if it is less than or equal to beta 2, the amplification multiple is equal to beta 2, that is, the amplification multiple is not the final amplification multiple calculated according to the adjustment value indicated by the first indication.

Optionally, in this embodiment of this application, an effective range of the first indication includes at least one of the following:

taking effect after X time units after the first indication is received; or an effective time of the first indication is before a next first indication takes effect, and X is a positive integer.

For example, the time unit may be any one of the following: a symbol, a slot, a sub-slot, a millisecond, a subframe, and a frame.

For example, a value of X may be a value agreed upon in a protocol or configured. For example, the protocol specifies a value range of X by specifying maximum and minimum values of X.

Optionally, in this embodiment of this application, an indication range of the first indication in the effective range includes at least one of the following:

amplification multiple-related parameters associated with N amplification multiple control processes;

amplification multiple-related parameters associated with M channels; or amplification multiple-related parameters associated with Y target resources;

where the target resource includes: a time domain resource and/or a frequency domain resource; and N, Y, and M are positive integers. For example, a typical value of N, Y, and M is 1.

It may be understood that the indication range in the effective range refers to: The indication range may take effect within the effective range. For example, the indication range may take effect after X time units after the first indication is received, and the power parameter of the signal amplifier is controlled and adjusted according to the indication range.

For example, when the indication range is amplification multiple-related parameters associated with N amplification multiple control processes, the indication range may further indicate the N amplification multiple control processes at the same time, that is, when the amplifier supports a plurality of amplification multiple control processes, amplification multiple-related parameters corresponding to one or more processes may be separately indicated. The indication manner may be an implicit indication, or may be an explicit indication, which is not limited in this embodiment of this application.

For example, when the indication range is amplification multiple-related parameters associated with M channels, the indication range may further indicate the M channels at the same time. The indication manner may be an implicit indication, or may be an explicit indication, which is not limited in this embodiment of this application.

For example, when the indication range is amplification multiple-related parameters associated with Y target resources, the indication range may further indicate the Y target resources at the same time. The indication manner may be an implicit indication, or may be an explicit indication, which is not limited in this embodiment of this application.

It may be understood that different control processes may be used for different beams between the upstream node and the signal amplifier. Different control processes may be used for different channels. Different control processes may be used for different time domain resources and/or frequency domain resources.

Optionally, in this embodiment of this application, a carrier of the first indication includes at least one of the following: cell-specific signaling, UE-specific signaling, or UE group common signaling.

It should be noted that the cell-specific signaling may be used when the signal amplifier contains only an RU and does not have an accompanying MT unit. When the signal amplifier includes the RU and the MT unit, the UE-specific signaling or the UE group common signaling may be received by using the MT unit, so as to obtain the target information of the RU.

For example, when the carrier of the first indication is UE-specific signaling or UE group common signaling, the first indication may be downlink control information (DCI), a medium access control control element (MAC CE), or radio resource control (RRC).

In an example, when the first indication is the DCI, the DCI may be in a new DCI format, a specific radio network temporary identifier (RNTI), or a specific field in the DCI.

In another example, when the first indication is the MAC CE, the MAC CE may be a MAC CE of a specific LCID, or the like.

Optionally, in this embodiment of this application, the path loss parameter includes a path loss from the upstream node to the signal amplifier.

For example, an amplification multiple of the signal amplifier or transmit power of the signal amplifier is proportional to the path loss.

For example, it is assumed that G0, alpha, and A are amplification multiple-related parameters, where G0 and A may be 0, alpha may be 1, PL is a path loss from the upstream node to the signal amplifier, A may be a sum of a plurality of amplification multiple-related parameters, and the amplification multiple Gain=G0+alpha×PL+A.

Optionally, in this embodiment of this application, in step 301, the gain control method for a signal amplifier provided in this embodiment of this application may include the following step 301*a* or step 301*b*.

Step 301*a*: The signal amplifier measures a downlink path loss according to a downlink signal.

Step 301*b*: When the signal amplifier has an MT unit, the MT unit measures the downlink path loss.

For example, there is a co-location relationship between the MT unit and the RU. The co-location relationship means that a channel state between the upstream node and the MT may replace a channel state between the upstream node and the RU, and the channel state includes a path loss.

Optionally, in this embodiment of this application, after step 303, the gain control method for a signal amplifier provided in this embodiment of this application may further include the following step 304.

Step 304: The signal amplifier reports the power parameter to the upstream node.

In this way, after adjusting the power parameter of the signal amplifier, the signal amplifier reports the adjusted power parameter to the upstream node, so that the upstream node receives the adjusted power parameter (for example, an increased power parameter) in a timely manner, so as to avoid a problem that a coverage range of a cell changes.

Optionally, in this embodiment of this application, in step 301, the gain control method for a signal amplifier provided in this embodiment of this application may include the following step 301*c*.

Step 301*c*: The signal amplifier obtains the target information from an upstream node of the signal amplifier.

For example, the signal amplifier obtains the target information from the upstream node, so that the signal amplifier determines the power adjustment parameter of the signal amplifier.

Optionally, in this embodiment of this application, before step 303, the gain control method for a signal amplifier provided in this embodiment of this application may further include the following step 305.

Step 305: The signal amplifier sends first information to the upstream node.

For example, the first information includes any one of the following: a first power parameter, a path loss parameter between the signal amplifier and the upstream node, a path loss measurement signal between the signal amplifier and the upstream node, and signal strength of an uplink signal measured by the signal amplifier.

For example, the first power parameter includes any one of the following: a maximum value of the amplification multiple or the transmit power, a minimum value of the amplification multiple or the transmit power, an expected value of the amplification multiple or the transmit power, a difference between the expected value and an actual value of the amplification multiple or the transmit power, and a headroom value of the amplification multiple or the transmit power.

For example, if the first information is: a path loss parameter between the signal amplifier and the upstream node, the signal amplifier measures the path loss parameter (for example, a downlink path loss) according to a downlink signal, and then sends the measured path loss parameter to the upstream node.

In an example, the signal amplifier may measure the path loss parameter by measuring received strength of the downlink signal.

For example, if the first information is: a path loss measurement signal between the signal amplifier and the upstream node, the signal amplifier may send a path loss measurement signal. Generally, the signal amplifier may send a path loss measurement signal at a location indicated by the upstream node and/or transmit power indicated by the upstream node, so that the upstream node measures the path loss.

In an example, the signal amplifier may send a sounding reference signal (SRS), a physical uplink control channel (PUCCH), or a physical uplink shared channel (PUSCH) to the upstream node for path loss measurement.

In an example, if the signal amplifier is equipped with an MT unit, the MT unit may perform path loss measurement from the upstream node to the amplifier, signal strength measurement from the upstream node to the amplifier, or send the first information. In this case, it may be assumed that a co-location relationship exists between a receive beam of the MT and a receive beam of the RU, or a co-location relationship exists between a transmit beam of the MT and a transmit beam of the RU. In addition, whether the co-location relationship exists may be determined by setting, protocol agreement, or configuration of the RU/MT.

For example, if the first information is: signal strength of an uplink signal measured by the signal amplifier, the signal amplifier measures received uplink signal strength, and sends a measurement value corresponding to the uplink signal strength to the upstream node, so that the upstream node generates and configures the target information of the signal amplifier according to the measurement value.

In an example, the signal amplifier may perform measurement according to resource areas of different uplink signals, and then send measurement values of different resource areas to the upstream node, so that the upstream node generates and configures target information of different resource areas of the signal amplifier according to the measurement values.

In another example, the signal amplifier may perform measurement according to a full carrier, and then send a full carrier measurement value to the upstream node, so that the upstream node generates and configures target information of different resource areas of the signal amplifier according to the measurement value.

It should be noted that, if the first information is: signal strength of an uplink signal measured by the signal amplifier, the signal amplifier may measure and report a fluctuation range, average strength, or maximum strength of received uplink signal strength within a period of time, so that an amplification multiple finally determined by the upstream node falls within a reasonable range. For example, it is ensured that the amplification multiple of the signal amplifier falls within a range of a predetermined amplification multiple maximum value and amplification multiple minimum value, that is, the signal amplifier does not exceed a saturated amplification multiple.

Figure 3:
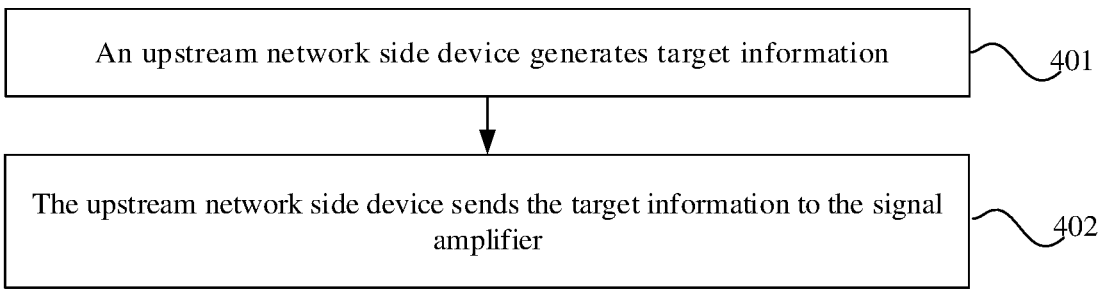
FIG. 3 is a second flowchart of a gain control method for a signal amplifier according to an embodiment of this application.

This embodiment provides a gain control method for a signal amplifier. As shown in FIG. 3, the gain control method for a signal amplifier includes the following steps 401 and 402.

Step 401: An upstream network side device generates target information.

In this embodiment of this application, for the target information, refer to the foregoing description. Details are not described herein again.

Step 402: The upstream network side device sends the target information to the signal amplifier.

In this embodiment of this application, the target information is used to indicate a power adjustment parameter of the signal amplifier, and the power adjustment parameter includes any one of the following: an amplification multiple-related parameter and a transmit power-related parameter.

In this embodiment of this application, for the power adjustment parameter, the amplification multiple-related parameter, and the transmit power-related parameter, refer to the foregoing description. Details are not described herein again.

According to the gain control method for a signal amplifier provided in this embodiment of this application, the upstream network side device may generate the target information (the amplification multiple-related parameter or the transmit power-related parameter) used to indicate the power adjustment parameter of the signal amplifier, and send the target information to the signal amplifier, so that the signal amplifier flexibly adjusts the amplification multiple or the power parameter, thereby avoiding a problem that a coverage range of a cell of the signal amplifier changes due to a change of a channel state.

Optionally, in this embodiment of this application, in step 401, the gain control method for a signal amplifier provided in this embodiment of this application may include the following step 401a.

Step 401a: The upstream network side device obtains auxiliary information to generate the target information.

Optionally, in this embodiment of this application, the auxiliary information includes any one of the following: a first power parameter, a path loss parameter between the signal amplifier and the upstream node, a path loss measurement signal between the signal amplifier and the upstream node, and signal strength of an uplink signal measured by the signal amplifier.

For example, the first power parameter may include any one of the following: a maximum value of the amplification multiple or the transmit power, a minimum value of the amplification multiple or the transmit power, an expected value of the amplification multiple or the transmit power, a difference between the expected value and an actual value of the amplification multiple or the transmit power, and a headroom value of the amplification multiple or the transmit power.

For example, for the path loss parameter between the signal amplifier and the upstream node, the path loss measurement signal between the signal amplifier and the upstream node, and the signal strength of the uplink signal measured by the signal amplifier, refer to the foregoing description. Details are not described herein again.

Optionally, in this embodiment of this application, when the auxiliary information is the path loss measurement signal between the signal amplifier and the upstream node, the generating target information in step 401a includes the following step 401a1.

Step 401a1: The upstream network side device indicates the signal amplifier to send the path loss measurement signal and/or transmit power of the measurement signal on a first resource, and measures the path loss parameter according to the path loss measurement signal and/or the transmit power.

For example, the first resource may be a sending location of the path loss measurement signal sent by the signal amplifier.

Optionally, in this embodiment of this application, when the auxiliary information is the signal strength of the uplink signal measured by the signal amplifier, the generating target information in step 401a includes the following step 401a2.

401a2: The upstream network side device configures different power adjustment parameters for P resource areas according to the measurement information, where P is a positive integer.

It should be noted that, according to the gain control method for a signal amplifier provided in this embodiment of this application, an execution body may be a gain control apparatus for a signal amplifier, or a control module that is in the gain control apparatus for a signal amplifier and that is used to perform the gain control method for a signal amplifier. In this embodiment of this application, an example in which the gain control apparatus for a signal amplifier performs the gain control method for a signal amplifier is used to describe a gain control apparatus for a signal amplifier provided in an embodiment of this application.

Figure 4:
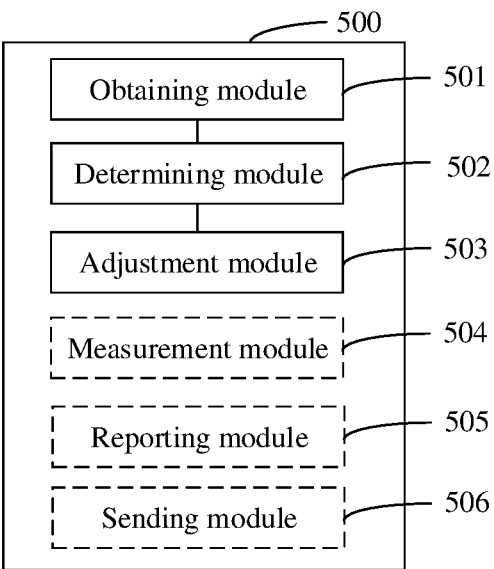
FIG. 4 is a first schematic structural diagram of a gain control apparatus for a signal amplifier according to an embodiment of this application.

An embodiment of this application provides a gain control apparatus for a signal amplifier. As shown in FIG. 4, the gain control apparatus for a signal amplifier 500 includes: an obtaining module 501, a determining module 502, and an adjustment module 503. The obtaining module 501 is configured to obtain target information; the determining module 502 is configured to determine a power adjustment parameter of the signal amplifier according to the target information obtained by the obtaining module 501, where the power adjustment parameter includes any one of the following: an amplification multiple-related parameter and a transmit power-related parameter; and the adjustment module 503 is configured to adjust a power parameter of the signal amplifier according to the power adjustment parameter determined by the determining module 502, where the power parameter includes any one of the following: an amplification multiple and transmit power.

According to the gain control apparatus for a signal amplifier provided in this embodiment of this application, after obtaining the target information, the gain control apparatus for a signal amplifier determines the amplification multiple-related parameter or the transmit power-related parameter of the signal amplifier according to the target information, and finally adjusts the amplification multiple or the transmit power of the signal amplifier according to the amplification multiple-related parameter or the transmit power-related parameter. In this way, when a channel state changes, the gain control apparatus for a signal amplifier may correspondingly flexibly adjust the amplification multiple and the transmit power of the signal amplifier in a manner of obtaining the target information in a timely manner, so as to avoid a problem of a change of a coverage range of a cell due to a change of the channel state.

Optionally, in this embodiment of this application, the target information includes at least one of the following: a first indication sent by an upstream node of the signal amplifier; a path loss parameter from the upstream node to the signal amplifier; or transmit power of a mobile termination MT of the signal amplifier; where the first indication is used to indicate the power adjustment parameter.

Optionally, in this embodiment of this application, an indication type of the first indication includes at least one of the following: a dynamic indication or a semi-static indication.

Optionally, in this embodiment of this application, the power adjustment parameter includes at least one of the following: an amplification multiple of the signal amplifier; an amplification multiple adjustment value of the signal amplifier; an amplification multiple control parameter of the signal amplifier; an amplification multiple control parameter adjustment value of the signal amplifier; transmit power of the signal amplifier; a transmit power adjustment value of the signal amplifier; a transmit power control parameter of the signal amplifier; or a transmit power control parameter adjustment value of the signal amplifier.

Optionally, in this embodiment of this application, at least one of the following is used to indirectly control the amplification multiple of the signal amplifier: the transmit power of the signal amplifier; the transmit power control parameter adjustment value of the signal amplifier; the transmit power control parameter of the signal amplifier; or the transmit power control parameter adjustment value of the signal amplifier.

Optionally, in this embodiment of this application, the amplification multiple adjustment value of the signal amplifier includes any one of the following: an adjustment value relative to an amplification multiple configured semi-statically; an adjustment value relative to an amplification multiple before the first indication is received; and an adjustment value relative to an amplification multiple before the first indication received takes effect.

Optionally, in this embodiment of this application, an effective range of the first indication includes at least one of the following: taking effect after X time units after the first indication is received; or an effective time of the first indication is before a next first indication takes effect, and X is a positive integer.

Optionally, in this embodiment of this application, an indication range of the first indication in the effective range includes at least one of the following: amplification multiple-related parameters associated with N amplification multiple control processes; amplification multiple-related parameters associated with M channels; or amplification multiple-related parameters associated with Y target resources; where the target resource includes: a time domain resource and/or a frequency domain resource; and N, Y, and M are positive integers.

Optionally, in this embodiment of this application, a carrier of the first indication includes at least one of the following: cell-specific signaling, UE-specific signaling, or UE group common signaling.

Optionally, in this embodiment of this application, the path loss parameter includes a path loss from the upstream node to the signal amplifier. An amplification multiple of the signal amplifier or transmit power of the signal amplifier is proportional to the path loss.

Optionally, in this embodiment of this application, the apparatus 500 further includes a measurement module 504. The measurement module is configured to measure a downlink path loss according to a downlink signal; or the measurement module is configured to: when the signal amplifier has an MT unit, measure the downlink path loss by using the MT unit.

Optionally, in this embodiment of this application, the apparatus 500 further includes a reporting module 505. The reporting module is configured to report the power parameter adjusted by the adjustment module to the upstream node.

Optionally, in this embodiment of this application, the obtaining module 501 is specifically configured to obtain the target information from an upstream node of the signal amplifier.

Optionally, in this embodiment of this application, the apparatus 500 further includes a sending module 506. The sending module 506 is configured to send first information to the upstream node by the signal amplifier; where the first information includes any one of the following: a first power parameter, a path loss parameter between the signal amplifier and the upstream node, a path loss measurement signal between the signal amplifier and the upstream node, and signal strength of an uplink signal measured by the signal amplifier; and the first power parameter includes any one of the following: a maximum value of the amplification multiple or the transmit power, a minimum value of the amplification multiple or the transmit power, an expected value of the amplification multiple or the transmit power, a difference between the expected value and an actual value of the amplification multiple or the transmit power, and a headroom value of the amplification multiple or the transmit power.

Figure 5:
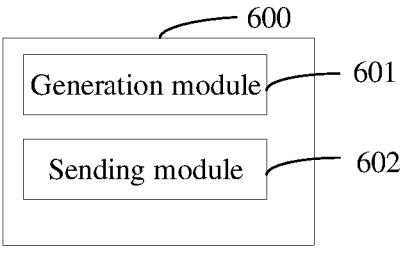
FIG. 5 is a second schematic structural diagram of a gain control apparatus for a signal amplifier according to an embodiment of this application.

An embodiment of this application further provides a gain control apparatus for a signal amplifier. As shown in FIG. 5, the gain control apparatus for a signal amplifier 600 includes a generation module 601 and a sending module 602. The generation module 601 is configured to generate target information. The sending module 602 is configured to send, to the signal amplifier, the target information generated by the generation module; where the target information is used to indicate a power adjustment parameter of the signal amplifier, and the power adjustment parameter includes any one of the following: an amplification multiple-related parameter and a transmit power-related parameter.

According to the gain control apparatus for a signal amplifier provided in this embodiment of this application, the gain control apparatus for a signal amplifier may generate the target information (the amplification multiple-related parameter or the transmit power-related parameter) used to indicate the power adjustment parameter of the signal amplifier, and send the target information to the signal amplifier, so that the signal amplifier flexibly adjusts the amplification multiple or the power parameter, thereby avoiding a problem that a coverage range of a cell of the signal amplifier changes due to a change of a channel state.

Optionally, in this embodiment of this application, the generation module 601 is specifically configured to obtain auxiliary information to generate the target information.

Optionally, in this embodiment of this application, the auxiliary information includes any one of the following: a first power parameter, a path loss parameter between the signal amplifier and the upstream node, a path loss measurement signal between the signal amplifier and the upstream node, and signal strength of an uplink signal measured by the signal amplifier.

Optionally, in this embodiment of this application, when the auxiliary information is the path loss measurement signal between the signal amplifier and the upstream node, the sending module 602 is specifically configured to: indicate the signal amplifier to send the path loss measurement signal and/or transmit power of the measurement signal on a first resource, and measure the path loss parameter according to the path loss measurement signal and/or the transmit power.

The gain control apparatus for a signal amplifier in this embodiment of this application may be an apparatus, an apparatus or an electronic device that has an operating system, or may be a component, an integrated circuit, or a chip in a communication device.

The gain control apparatus for a signal amplifier provided in this embodiment of this application can implement various processes realized in the method embodiments of FIG. 2 and FIG. 3, and achieve the same technical effects. To avoid repetition, details are not described herein.

Figure 6:
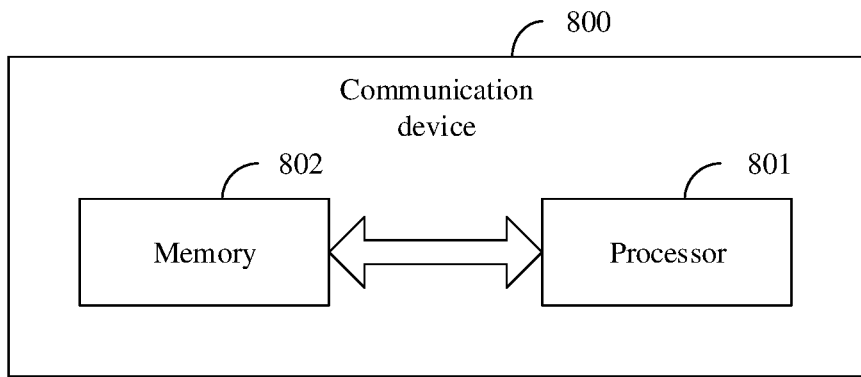
FIG. 6 is a schematic structural diagram of a communication device according to an embodiment of this application.

Optionally, as shown in FIG. 6, an embodiment of this application further provides a communication device 800, including a processor 801, a memory 802, and a program or instructions stored in the memory 802 and executable on the processor 801. For example, when the communication device 800 is a terminal, each process of the embodiment of the gain control method for a signal amplifier is implemented when the program or the instructions are executed by the processor 801, and a same technical effect can be achieved. When the communication device 800 is a network side device, each process of the embodiment of the gain control method for a signal amplifier is implemented when the program or the instructions are executed by the processor 801, and a same technical effect can be achieved. To avoid repetition, details are not described herein again.

An embodiment of this application further provides a network side device, including a processor and a communication interface, where the processor is configured to obtain target information; the processor is further configured to determine a power adjustment parameter of a signal amplifier according to the target information, where the power adjustment parameter includes any one of the following: an amplification multiple-related parameter and a transmit power-related parameter; and the processor is further configured to adjust a power parameter of the signal amplifier according to the power adjustment parameter, where the power parameter includes any one of the following: an amplification multiple and transmit power.

An embodiment of this application further provides a network side device, including a processor and a communication interface, where the processor is configured to generate target information, and the communication interface is configured to send the target information to a signal amplifier; where the target information is used to indicate a power adjustment parameter of the signal amplifier, and the power adjustment parameter includes any one of the following: an amplification multiple-related parameter and a transmit power-related parameter.

The foregoing network-side device embodiment is corresponding to the foregoing network-side device method embodiment. Each implementation process and implementation of the foregoing method embodiment may be applicable to the network-side device embodiment, and a same technical effect can be achieved.

Figure 7:
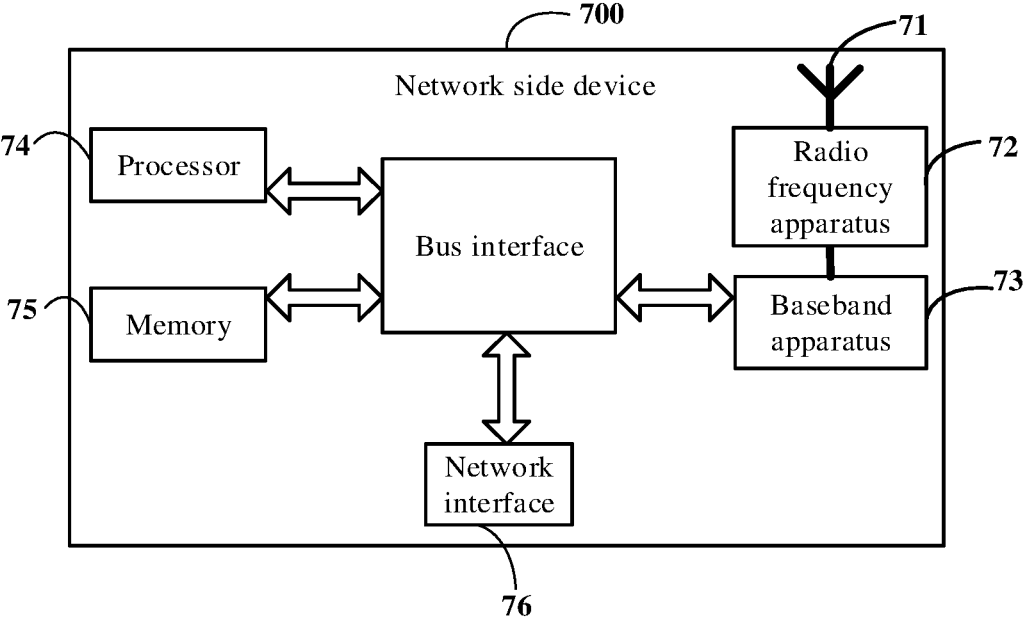
FIG. 7 is a schematic diagram of a hardware structure of a network side device according to an embodiment of this application.

An embodiment of this application further provides a network side device. As shown in FIG. 7, a network side device 700 includes: an antenna 71, a radio frequency device 72, and a baseband device 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes information that needs to be sent, and sends processed information to the radio frequency apparatus 72. The radio frequency apparatus 72 processes the received information, and sends processed information by using the antenna 71.

The frequency band processing apparatus may be located in the baseband apparatus 73, and the method performed by the network side device in the foregoing embodiment may be implemented in the baseband apparatus 73. The baseband apparatus 73 includes a processor 74 and a memory 75.

The baseband apparatus 73 may include, for example, at least one baseband board, where a plurality of chips are disposed on the baseband board. As shown in FIG. 7, one chip is, for example, the processor 74, which is connected to the memory 75, so as to schedule a program in the memory

75 to perform an operation of the network device shown in the foregoing method embodiment.

The baseband apparatus 73 may further include a network interface 76, configured to exchange information with the radio frequency apparatus 72. For example, the interface is a common public radio interface (CPRI).

Optionally, the network side device of this embodiment of the present invention further includes: instructions or a program stored in the memory 75 and executable on the processor 74. The processor 74 invokes the instructions or the program in the memory 75 to perform the method performed by the modules shown in FIG. 7, and achieves a same technical effect. To avoid repetition, details are not described herein again.

When the network side device is a signal amplifier, the baseband apparatus 73 is configured to obtain target information; the baseband apparatus 73 is further configured to determine a power adjustment parameter of a signal amplifier according to the target information, where the power adjustment parameter includes any one of the following: an amplification multiple-related parameter and a transmit power-related parameter; and the baseband apparatus 73 is further configured to adjust a power parameter of the signal amplifier according to the power adjustment parameter, where the power parameter includes any one of the following: an amplification multiple and transmit power.

According to the network side device provided in this embodiment of this application, after obtaining the target information, the network side device determines the amplification multiple-related parameter or the transmit power-related parameter of the signal amplifier according to the target information, and finally adjusts the amplification multiple or the transmit power of the signal amplifier according to the amplification multiple-related parameter or the transmit power-related parameter. In this way, when a channel state changes, the signal amplifier may correspondingly flexibly adjust the amplification multiple and the transmit power of the signal amplifier in a manner of obtaining the target information in a timely manner, so as to avoid a problem of a change of a coverage range of a cell due to a change of the channel state.

Optionally, the target information includes at least one of the following: a first indication sent by an upstream node of the signal amplifier; a path loss parameter from the upstream node to the signal amplifier; or transmit power of a mobile termination MT of the signal amplifier; where the first indication is used to indicate the power adjustment parameter.

Optionally, an indication type of the first indication includes at least one of the following: a dynamic indication or a semi-static indication.

Optionally, the power adjustment parameter includes at least one of the following: an amplification multiple of the signal amplifier; an amplification multiple adjustment value of the signal amplifier; an amplification multiple control parameter of the signal amplifier; an amplification multiple control parameter adjustment value of the signal amplifier; transmit power of the signal amplifier; a transmit power adjustment value of the signal amplifier; a transmit power control parameter of the signal amplifier; or a transmit power control parameter adjustment value of the signal amplifier.

Optionally, at least one of the following is used to indirectly control the amplification multiple of the signal amplifier: the transmit power of the signal amplifier; the transmit power control parameter adjustment value of the signal amplifier; the transmit power control parameter of the signal amplifier; or the transmit power control parameter adjustment value of the signal amplifier.

Optionally, the amplification multiple adjustment value of the signal amplifier includes any one of the following: an adjustment value relative to an amplification multiple configured semi-statically; an adjustment value relative to an amplification multiple before the first indication is received; and an adjustment value relative to an amplification multiple before the first indication received takes effect.

Optionally, an effective range of the first indication includes at least one of the following: taking effect after X time units after the first indication is received; or an effective time of the first indication is before a next first indication takes effect, and X is a positive integer.

Optionally, an indication range of the first indication in the effective range includes at least one of the following: amplification multiple-related parameters associated with N amplification multiple control processes; amplification multiple-related parameters associated with M channels; or amplification multiple-related parameters associated with Y target resources; where the target resource includes: a time domain resource and/or a frequency domain resource; and N, Y, and M are positive integers.

Optionally, a carrier of the first indication includes at least one of the following: cell-specific signaling, UE-specific signaling, or UE group common signaling.

Optionally, the path loss parameter includes a path loss from the upstream node to the signal amplifier; and An amplification multiple of the signal amplifier or transmit power of the signal amplifier is proportional to the path loss.

Optionally, the baseband apparatus 73 is specifically configured to measure a downlink path loss according to a downlink signal by the signal amplifier; or specifically configured to: when the signal amplifier has an MT unit, measure the downlink path loss by using the MT unit.

Optionally, the radio frequency apparatus 72 is configured to report the power parameter to the upstream node.

Optionally, the baseband apparatus 73 is specifically configured to obtain the target information from an upstream node of the signal amplifier.

Optionally, the radio frequency apparatus 72 is further configured to send first information to the upstream node; where the first information includes any one of the following: a first power parameter, a path loss parameter between the signal amplifier and the upstream node, a path loss measurement signal between the signal amplifier and the upstream node, and signal strength of an uplink signal measured by the signal amplifier; and the first power parameter includes any one of the following: a maximum value of the amplification multiple or the transmit power, a minimum value of the amplification multiple or the transmit power, an expected value of the amplification multiple or the transmit power, a difference between the expected value and an actual value of the amplification multiple or the transmit power, and a headroom value of the amplification multiple or the transmit power.

When the network side device is an upstream network side device, the baseband apparatus 73 is configured to generate target information; and the radio frequency apparatus 72 is configured to send the target information to the signal amplifier; where the target information is used to indicate a power adjustment parameter of the signal amplifier, and the power adjustment parameter includes any one of the following: an amplification multiple-related parameter and a transmit power-related parameter.

According to the network side device provided in this embodiment of this application, the network side device may generate the target information (the amplification multiple-related parameter or the transmit power-related parameter) used to indicate the power adjustment parameter of the signal amplifier, and send the target information to the signal amplifier, so that the signal amplifier flexibly adjusts the amplification multiple or the power parameter, thereby avoiding a problem that a coverage range of a cell of the signal amplifier changes due to a change of a channel state.

Optionally, the baseband apparatus 73 is specifically configured to obtain auxiliary information to generate the target information.

Optionally, the auxiliary information includes any one of the following: a first power parameter, a path loss parameter between the signal amplifier and the upstream node, a path loss measurement signal between the signal amplifier and the upstream node, and signal strength of an uplink signal measured by the signal amplifier.

Optionally, when the auxiliary information is the path loss measurement signal between the signal amplifier and the upstream node, the baseband apparatus 73 is specifically configured to: indicate the signal amplifier to send the path loss measurement signal and/or transmit power of the measurement signal on a first resource, and measure the path loss parameter according to the path loss measurement signal and/or the transmit power.

An embodiment of this application further provides a non-transitory readable storage medium. The non-transitory readable storage medium stores a program or instructions. When the program or the instructions is or are executed by a processor, various processes in the foregoing embodiment of the gain control method for a signal amplifier are implemented, and a same technical effect can be achieved. To avoid repetition, details are not described herein again.

The processor is a processor in the foregoing communication device in the foregoing embodiment. The non-transitory readable storage medium includes a non-transitory computer-readable storage medium such as a read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions to implement various processes in the foregoing embodiment of the gain control method for a signal amplifier, and a same technical effect can be achieved. To avoid repetition, details are not described herein again.

It should be understood that the chip mentioned in this embodiment of this application may also be referred to as a system-level chip, a system chip, a chip system, or a system on chip.

It should be noted that, the terms "include", "comprise", or any other variation thereof in this specification are intended to cover a non-exclusive inclusion, so that a process, method, article, or apparatus that includes a list of elements includes the elements, and also includes other elements that are not expressly listed, or further includes elements inherent to such a process, method, article, or apparatus. Without more limitations, elements defined by the sentence "including one" does not exclude that there are still other same elements in the processes, methods, objects, or apparatuses that include the elements. In addition, it should be noted that the scope of the method and apparatus in the embodiments of this application is not limited to performing a function in a sequence shown or discussed, and may further include performing a function in a basically simultaneous manner or in a reverse sequence based on a related function. For example, the described method may be performed in an order from the described order, and various steps may be added, omitted, or combined. In addition, features described with reference to some examples may be combined in other examples.

Based on the descriptions in the foregoing implementations, a person skilled in the art may clearly learn that the method in the foregoing embodiment may be implemented by software in addition to a necessary universal hardware platform or by hardware only. In most circumstances, the former is a better implementation. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a communication device (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific implementations. The foregoing specific implementations are merely examples, and are not restrictive. Under the enlightenment of this application, many forms may be further made by a person of ordinary skill in the art without departing from the objective of this application and the protection scope of the claims and shall fall within the protection scope of this application.

What is claimed is:

1. A gain control method for a signal amplifier, comprising:

obtaining, by the signal amplifier, target information;

determining, by the signal amplifier, a power adjustment parameter of the signal amplifier according to the target information, wherein the power adjustment parameter comprises: an amplification multiple-related parameter; and adjusting, by the signal amplifier, a power parameter of the signal amplifier according to the power adjustment parameter, wherein the power parameter comprises: an amplification multiple;

wherein the target information comprises:

a first indication sent by an upstream node of the signal amplifier, wherein the first indication is used to indicate the power adjustment parameter; and a path loss (PL) parameter from the upstream node to the signal amplifier;

wherein the amplification multiple-related parameter comprises G0, alpha, and A, and the amplification multiple is Gain=G0+alpha×PL+A.

2. The method according to claim 1, wherein the target information further comprises:

transmit power of a mobile termination MT of the signal amplifier.

3. The method according to claim 2, wherein an indication type of the first indication comprises at least one of the following: a dynamic indication or a semi-static indication.

4. The method according to claim 2, wherein the power adjustment parameter comprises at least one of the following:

an amplification multiple of the signal amplifier;

an amplification multiple adjustment value of the signal amplifier;

an amplification multiple control parameter of the signal amplifier;

an amplification multiple control parameter adjustment value of the signal amplifier;

transmit power of the signal amplifier;

a transmit power adjustment value of the signal amplifier;

a transmit power control parameter of the signal amplifier; or a transmit power control parameter adjustment value of the signal amplifier.

5. The method according to claim 4, wherein at least one of the following is used to indirectly control the amplification multiple of the signal amplifier:

the transmit power adjustment value of the signal amplifier;

the transmit power control parameter adjustment value of the signal amplifier;

the transmit power control parameter of the signal amplifier; or the transmit power control parameter adjustment value of the signal amplifier.

6. The method according to claim 4, wherein the amplification multiple adjustment value of the signal amplifier comprises any one of the following:

an adjustment value relative to an amplification multiple configured semi-statically;

an adjustment value relative to an amplification multiple before the first indication is received; and an adjustment value relative to an amplification multiple before the first indication received takes effect.

7. The method according to claim 2, wherein an effective range of the first indication comprises at least one of the following:

taking effect after X time units after the first indication is received; or an effective time of the first indication is before a next first indication takes effect, and X is a positive integer.

8. The method according to claim 2, wherein an indication range of the first indication in the effective range comprises at least one of the following:

amplification multiple-related parameters associated with N amplification multiple control processes;

amplification multiple-related parameters associated with M channels; or amplification multiple-related parameters associated with Y target resources;

wherein the target resource comprises: a time domain resource and/or a frequency domain resource; and N, Y, and M are positive integers.

9. The method according to claim 2, wherein a carrier of the first indication comprises at least one of the following: cell-specific signaling, UE-specific signaling, or UE group common signaling.

10. The method according to claim 2, wherein the path loss parameter comprises a path loss from the upstream node to the signal amplifier; and an amplification multiple of the signal amplifier or transmit power of the signal amplifier is proportional to the path loss.

11. The method according to claim 10, wherein the obtaining, by the signal amplifier, the loss parameter comprises:

measuring, by the signal amplifier, a downlink path loss according to a downlink signal; or when the signal amplifier has an MT unit, measuring, by the MT unit, the downlink path loss.

12. The method according to claim 11, wherein after the adjusting a power parameter of the signal amplifier, the method further comprises:

reporting, by the signal amplifier, the power parameter to the upstream node.

13. The method according to claim 1, wherein the obtaining, by the signal amplifier, target information comprises:

obtaining, by the signal amplifier, the target information from the upstream node of the signal amplifier.

14. The method according to claim 13, wherein before the obtaining, by the signal amplifier, target information, the method further comprises:

sending, by the signal amplifier, first information to the upstream node;

wherein the first information comprises any one of the following: a first power parameter, a path loss parameter between the signal amplifier and the upstream node, a path loss measurement signal between the signal amplifier and the upstream node, and signal strength of an uplink signal measured by the signal amplifier; and the first power parameter comprises any one of the following: a maximum value of the amplification multiple or the transmit power, a minimum value of the amplification multiple or the transmit power, an expected value of the amplification multiple or the transmit power, a difference between the expected value and an actual value of the amplification multiple or the transmit power, and a headroom value of the amplification multiple or the transmit power.

15. A gain control method for a signal amplifier, comprising:

generating, by an upstream network side device, target information; and sending, by the upstream network side device, the target information to the signal amplifier;

wherein the target information is used to indicate a power adjustment parameter of the signal amplifier, and the power adjustment parameter comprises: an amplification multiple-related parameter;

the power adjustment parameter is used for adjusting a power parameter of the signal amplifier, wherein the power adjustment parameter comprises an amplification multiple;

and the target information comprises:

a first indication, wherein the first indication is used to indicate the power adjustment parameter; and a path loss (PL) parameter from the upstream network side device to the signal amplifier;

wherein the amplification multiple-related parameter comprises G0, alpha, and A, and the amplification multiple is Gain=G0+alpha×PL+A.

16. The method according to claim 15, wherein the generating, by an upstream network side device, target information comprises:

obtaining, by the upstream network side device, auxiliary information to generate the target information.

17. The method according to claim 16, wherein the auxiliary information comprises any one of the following:

a first power parameter, a path loss parameter between the signal amplifier and the upstream network side device, a path loss measurement signal between the signal amplifier and the upstream network side device, and signal strength of an uplink signal measured by the signal amplifier.

18. The method according to claim 16, wherein when the auxiliary information is the path loss measurement signal between the signal amplifier and the upstream network side device, the generating target information comprises:

indicating, by the upstream network side device, the signal amplifier to send the path loss measurement signal and/or transmit power of the measurement signal on a first resource, and measuring the path loss parameter according to the path loss measurement signal and/or the transmit power.

19. A signal amplifier, comprising a processor, a memory, and a program or instruction stored in the memory and executable on the processor, wherein the program or instruction, when executed by the processor, causes the signal amplifier to perform:

obtaining target information;

determining a power adjustment parameter of the signal amplifier according to the target information, wherein the power adjustment parameter comprises: an amplification multiple-related parameter; and adjusting a power parameter of the signal amplifier according to the power adjustment parameter, wherein the power parameter comprises: an amplification multiple;

wherein the target information comprises:

a first indication sent by an upstream node of the signal amplifier, wherein the first indication is used to indicate the power adjustment parameter; and a path loss (PL) parameter from the upstream node to the signal amplifier;

wherein the amplification multiple-related parameter comprises G0, alpha, and A, and the amplification multiple is Gain=G0+alpha×PL+A.

20. A non-transitory computer readable storage medium, wherein a program or instruction is stored on the non-transitory computer readable storage medium, and when the program or instruction is executed by a processor, the steps of the gain control method for a signal amplifier according to claim 1 are implemented.

* * * * *